INVENTORS
Floyd T. Hague &
Frederick R. J. Davis
BY
ATTORNEY

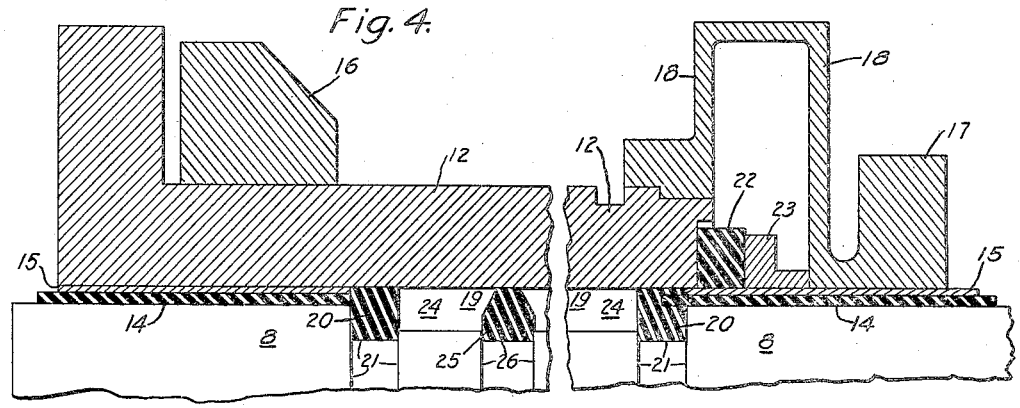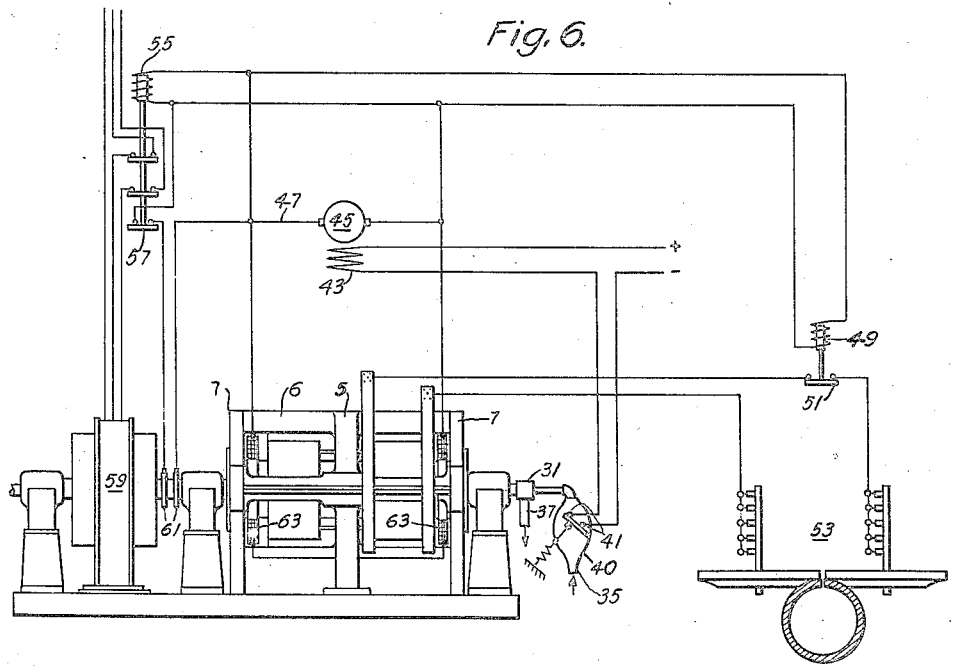

Patented June 21, 1938

2,121,593

UNITED STATES PATENT OFFICE

2,121,593

COOLING AND MOUNTING OF COLLECTORS FOR UNIPOLAR GENERATORS

Floyd T. Hague, Pittsburgh, and Frederick R. J. Davis, Irwin, Pa., assignors to Westinghouse Electric & Manufacturing Company, East Pittsburgh, Pa., a corporation of Pennsylvania Application December 14, 1935, Serial No. 54,516

15 Claims. (Cl. 171—212)

Our invention relates to collector-cylinders for dynamo-electric machines, and it has particular relation to water-cooled collector-cylinders for unipolar generators of low voltage and high current capacity, such as are utilized for resistance-welding.

In unipolar generators, the limiting factor in design is the diameter of the collector for the following reasons. The collector is mounted on the shaft through which passes the useful magnetic flux of the machine; thus the internal diameter of the collector is important as it limits the flux and consequently the generated voltage; while the outer diameter of the collector must be kept within the limits that give a peripheral speed not too high for good brush-operation and collector-wear. It is essential, therefore, to keep the space which is occupied radially by the collector cylinder and its cooling means as small as efficient operation will permit.

An object of our invention is to provide more efficient cooling of the long, massive, collector-cylinders which occupy nearly the entire rotor member of such generators, whereby a more uniform temperature is maintained at all points along the collectors, and whereby the space-requirements are kept down to a minimum.

A further object of our invention is to provide a novel mounting-means for the large collector cylinders of such generators so as to avoid difficulties due to thermal expansions and contractions, particularly in conjunction with the water cooling means previously mentioned.

A further object of our invention is to provide a unipolar generator having armature-conductors and collector cylinders which are insulated from the steel shaft, thereby avoiding the variation in current during the first minute of operation which would occur if some of the current were drawn through the very highly inductive steel shaft.

A still further object of our invention is to provide means whereby our unipolar generator with its water-cooled collector-cylinders cannot be operated to deliver any substantial currents if the water-circulating system is not operating, or if it fails for even a very brief period of time.

With the foregoing and other objects in view our invention consists in the structural details, combinations, systems and methods hereinafter described and claimed, and illustrated in the accompanying drawings, wherein Figure 1 is an elevational view of a unipolar generator in accordance with our invention, with parts shown in longitudinal section;

Figs. 4 and 5 are detailed views, on a larger scale than Fig. 2, showing the respective ends of the collector cylinder, and Fig. 6 is a diagrammatic view of circuits and connections showing our invention as utilized in a resistance-welding system.

In the welding industry, as in the resistance-welding of pipes, and for other purposes, direct current has certain advantages over alternating current, and this circumstance has led to a demand for larger and larger direct-current generators of very low voltage. The conventional commutator-type direct-current generator becomes relatively uneconomical, as compared to unipolar generators, at outputs of much above 35,000 amperes. The expedient of utilizing a plurality of commutator-type generators in parallel, in an effort to secure the large currents needed by certain welding operations, leads to difficulties due to the inductive characteristics of the paralleled lead-circuits.

For the foregoing and other reasons, we have developed a unipolar generator, sometimes known as an acyclic generator, or as a homopolar generator, capable of delivering 150,000 amperes at a voltage which is variable within a range of from 4 to 7 volts. This generator and its associated leads have a low inductive characteristic which is very favorable for a welding application. It has involved a considerable amount of development work which is covered in the present application, and in a number of copending applications filed by the assignee of this application, including our application, Serial No. 54,898, filed December 17, 1935, for Current-collection apparatus, our application, Serial No. 54,517, filed December 14, 1935, for Field windings for unipolar generators; our application, Serial No. 54,518, filed December 14, 1935, for a Compensated unipolar generator; and an application of H. Matthews, Serial No. 54,465, filed December 14, 1935, for Collector-neck connections.

Figure 1:
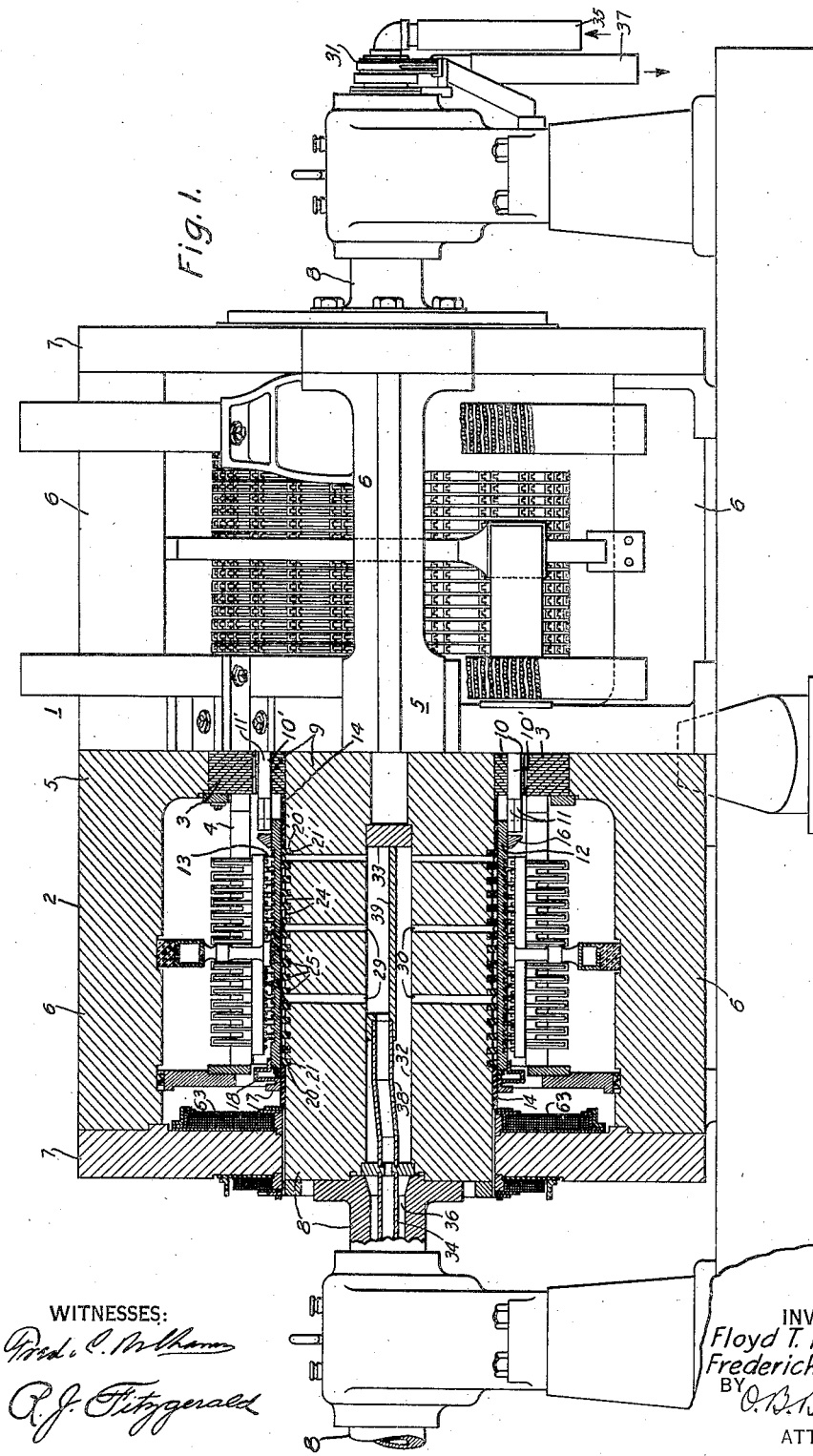

As shown in Fig. 1, the unipolar generator comprises a stator member 1 consisting of a yoke 2 made of low-carbon steel to insure good permeability, and a core member 3 which is laminated because it supports a compensating winding 4 which constitutes the subject-matter of said copending application on a compensated unipolar generator. The yoke member has a central core portion 5 of relatively short axial extent, and a plurality of axially or longitudinally extending arms 6 on each side of the core portion 5, the particular embodiment of our invention shown in the drawings having four yoke arms on each end of the machine. Each group of four arms 6 of the yoke member terminates in an end bracket 7 through which passes a forged steel shaft 8 of the rotor member 9, completing the magnetic circuit of the machine.

The rotor shaft 8 is provided with a centrally disposed laminated rotor core 10, cooperating with the stator core 3. The rotor core is provided with copper armature-winding conductors 11 which are secured at their ends to two long collector-cylinders 12, from which current is collected by means of about 700 brushes 13, at each end of the machine, as described and claimed in the aforesaid copending application on a compensated unipolar generator.

A desirable feature of our invention is that although electrically the armature-conductors 11 are at the same potential as the armature-core 10, and need no insulation therebetween according to the general theory of the unipolar generator, the portions of our armature-conductors which lie in the core-slots 10' are nevertheless provided with a protective covering of insulation 11' in order to provide a mechanical pad for the conductors in the slot, so as to facilitate winding and provide easy means for slippage of the conductors, to prevent the possibility of stresses of expansion and contraction.

According to our present invention, which constitutes the particular subject-matter of this application, we have provided special means for cooling and mounting these collector-cylinders 12.

Figure 2:
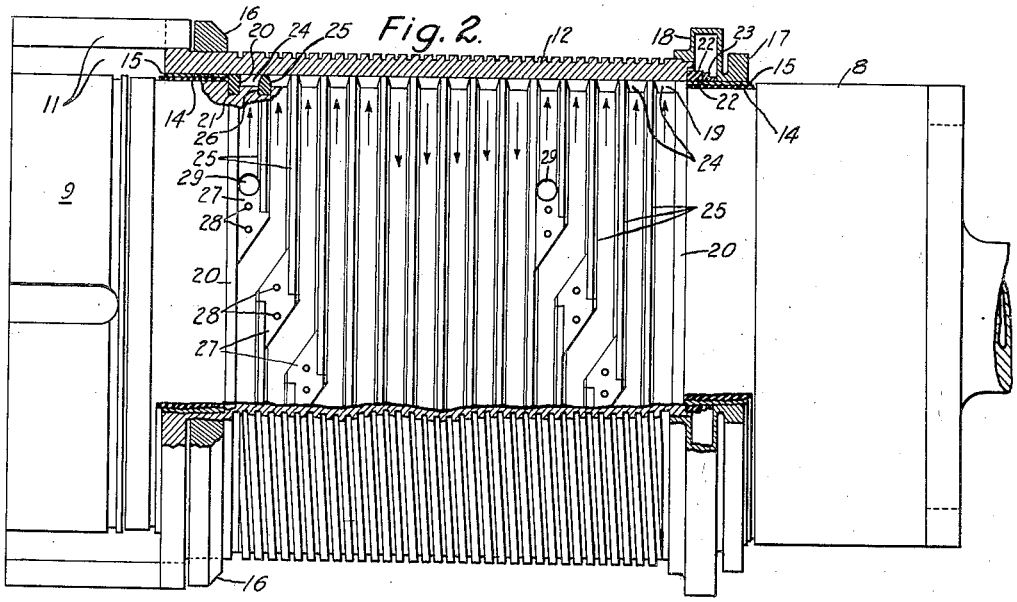
Fig. 2 is a detailed elevational view of a part of the shaft, with a collector cylinder in place, and the rubber rings forming some of the water channels under the collector cylinder.

As shown more in detail in Figs. 2, 4 and 5, each of the collector-cylinders 12 has its inner end firmly anchored to the shaft 8, being separated from the shaft by a wide band or ring 14 of insulating material such as mica, which is protected by a metal sleeve 15. The collector cylinder is preferably held in place, at its inner end, by a shrink-ring 16.

At the outer end of each collector provision must be made for thermal expansions and contractions in an axial direction because each collector-cylinder is some 36 inches long and is a copper-alloy casting which will expand approximately 1.7 mils per inch of length per 100° C. rise in temperature, or approximately .06 inch over-all. At the outer end of each of the collector-cylinders 12, as shown in Fig. 5, the shaft is again provided with a wide insulating band 14 protected by its metal sleeve 15, but the collector cylinder is left free to slide axially over this protective sleeve 15, being centered with respect to the shaft by means of a specially constructed shrink-ring 17 which has a convoluted thin portion 18 terminating in a flange which contacts with the end of the collector cylinder in such way that the collector cylinder is centered with respect to the shaft while being free, without material restriction, to expand and contract due to temperature-changes in the collector.

Our insulation of the collector-cylinders 12 from the shaft-forging 8 is an important feature in unipolar generators, particularly in unipolar generators of large current-output. It is theoretically correct that each collector-cylinder has exactly the same electrical potential as the portion of the shaft underneath it, and that no detrimental losses or unusual heating would be developed by mounting the collectors in solid electrical contact with the shaft. This follows from the consideration that the rotor member of a low-voltage unipolar machine is merely a half-turn of conductor, and as such there is no electrical need for insulation of any kind therein.

However, our theoretical study of the parallel circuits which would exist between the two collectors if the collectors were solidly connected to the ends of the shaft has shown that the copper armature-winding, located, as it is, on the outer periphery of the rotor core, has a very low inductance, whereas the parallel path for the current through the body of the steel rotor-forging represents a circuit of extremely high inductance. Accordingly, if both collectors were grounded directly to the rotor forging, the first instantaneous flow of current, upon the application of load, would be altogether through the low-inductance armature winding, and, as time progressed, current would gradually be built up in the highly inductive iron circuit. As a result, the current would build up slowly to a value which is slightly higher than the initial value, then falling again due to the saturation of the rotor iron by reason of the current flowing therethrough. Thus several seconds, or even a minute, would elapse before the current reached a final steady value, as compared to about $\frac{1}{5}$ of a second when the collectors and the armature-conductors are insulated. In heavy welding work, such as resistance pipe-welding, where each welding-operation may last only a minute, it is quite important for the current to reach its final value quickly, because the welds will not be at their best except at a certain current-strength, and frequently the length of pipe which is welded during the transient period is wasted, because of the poor welds which are obtained before the current reaches a steady value.

Between the two insulating bands 14 under each collector-cylinder 12, the shaft 8 is of reduced diameter, thus defining an annular space 19 which is utilized for the water-cooling of the collector 12. This annular, water-cooled space 19 is made water-tight at each end, by means of soft-rubber rings 20 which are held in place by means of grooves 21 in the shaft, and which are compressed when the collector-cylinder 12 is shrunk into place in the assembly of the machine. The rubber ring 20 at the outer end of each collector cylinder is sufficiently flexible to be distorted when the collector-cylinder expands and contracts, following the movements of the collector-cylinder without permitting leakage of water, even under water-pressures of 50 or 100 pounds per square inch. Inasmuch as the water limits the collector temperature-variations to well under 100° C., it will be obvious that this rubber ring is not subjected to a great deal of heating, and it has been found in practice that no difficulty is experienced due to leaking. In the particular design shown in the drawings, an additional rubber ring 22 is disposed around the protective metal sleeve 15 at the floating end of each collector cylinder, as shown more in detail in Fig. 5. This rubber ring is compressed between the end of the collector-cylinder 12 and a retainer-ring 23 which surrounds the shaft within the convolutions 18 of the shrink-ring 17.

According to previous data published on the subject of heat-interchange between a moving body of water and the walls of its passageways, the amount of heat that can be taken from a surface in contact with moving water is proportional to the water velocities for velocities up to about 2.5 ft./sec. Up to this velocity the flow of water is known as laminar and its ability to absorb heat from a surface is relatively very low. Above this critical velocity the water flow changes from laminar to turbulent and the scrubbing action of the water on the pipe walls is greatly increased, and accordingly the ability of the water to take heat from the surface is greatly increased. We have accordingly designed this machine with water velocities sufficiently high to be assured of turbulent water flow conditions, but not sufficiently high to require uneconomical water-pressures. We utilize velocities of from 10 to 12 feet per second, depending upon the amount of water which is utilized, normally utilizing a velocity of perhaps 11½ feet per second. We should say that, in general, it would be desirable to utilize a water velocity in excess of about 8 feet per second under the collector cylinders.

With the foregoing ends in view we have provided spiral passageways 24 for securing a high velocity of the cooling-water in the annular cooling chambers 19 under the collector-cylinders 12. We have also devised a novel means for conveniently forming the walls separating these spiral grooves or passageways, without resorting to the expedient of cutting the same into the metal of either the shaft or the under side of the collector-cylinder. We avoid the use of metal walls for the spiral grooves, in order to provide a structure which has a minimum amount of corrosion characteristics.

Inasmuch as there is an electrolytic voltage produced between dissimilar metals, in this case a copper-alloy collector-ring and a steel shaft forging, producing an electrolytic voltage of about .2 volt, and inasmuch as there may be voltage-differences between the collector cylinder and the portion of the shaft under it, due either to the resistance-drops in the armature conductors 11, or to flux-leakage effects resulting in possible differences in the generated voltages in the armature conductors 11 and in the shaft, respectively, or in the generated voltages in the collector-cylinders 12 and in the portions of the shaft under said cylinders, it must be recognized that at least a small amount of current will flow through the body of cooling-water under each collector-cylinder. Tests have shown, however, that ordinary tap-water is sufficiently insulating so that the current-flow under these circumstances will be very considerably less than 1 microampere per square inch of contact-surface, corresponding to a corrosion-rate of only a few thousands of an inch per year.

We have also ascertained, by chemical analysis and by tests, that this small amount of corrosion-effect will not produce scale in the spiral passageways under the collector-cylinders, particularly when the high water-velocities described above are utilized. The ferrous hydroxide which is produced by the electrolytic dissolution of the iron is slightly soluble, and does not form a scale unless it can react with the salts present in the water, such as the carbonates and the sulphates. When the water is passed through the passageways at a high speed, the ferrous hydroxide is swept out of the passageways before such reactions and precipitations can occur. Any accumulations of rust or scale which may be produced during idle periods are also readily dislodged by the high-velocity water when the machine is again placed in service, so that no corrosion-difficulties are experienced.

The foregoing discussion of corrosion-effects is predicated, however, on the supposition that the spacing between the copper-alloy and iron surfaces is one-half inch or more. If the two surfaces are brought closer together, the electrolytic action and the corrosion-effects will be much greater. As an essential feature of our novel water-circulating system, therefore, we specify that the walls separating the spiral grooves or passageways 24 shall be of insulating material.

Figure 3:
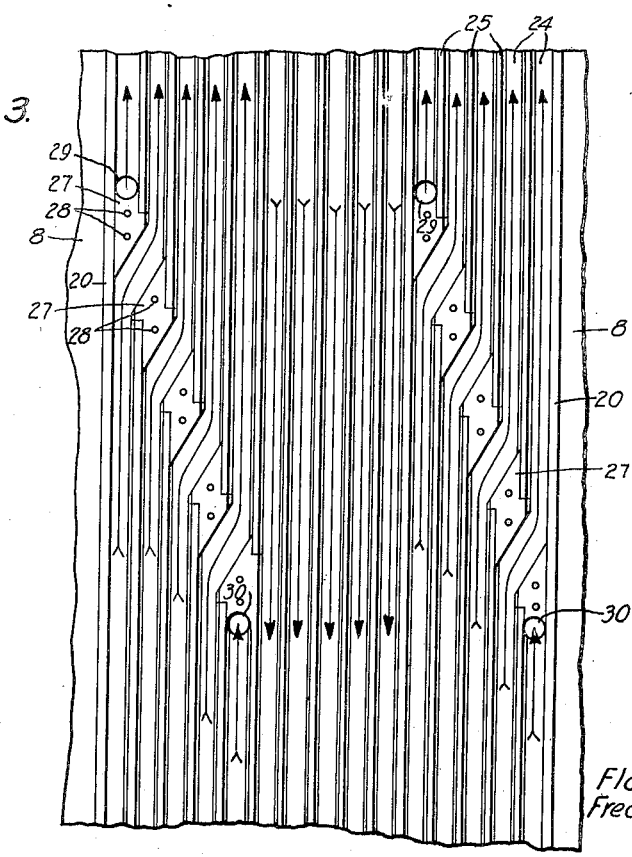
Fig. 3 is a partial development of the shaft and the water channels thereon.

As shown in Figs. 2 and 3, our spiral passageways 24 are formed by first providing circumferential grooves and then by providing cross-overs from one circumferential groove to the next, to form the spiral passageways for the cooling water. The circumferential grooves are formed between molded-rubber rings 25 which are held in place by shallow grooves 26 cut in the shaft 8, the rubber rings being preferably cemented in place. To form the cross-overs, adjacent rubber rings are cut away for short distances and rhomboidal rubber spacers 27 are provided, being held in place by rubber-cement and lignum vitae pins 28.

In order to obtain uniformity of cooling on the large collector-cylinders 12 we have arranged to introduce the cooling water into the spiral passageways 24 in three separate circuits spaced along the axis of the collector, in order to avoid having one end of the collector hotter than the other. In the precise arrangement shown in the drawings these three cooling circuits introduce the water at the three axially distributed points 29 indicated in the upper half of Fig. 1, and in each case the water is led five times around the shaft before being discharged at three other points 30 indicated in the bottom half of Fig. 1. Some of these points are conveniently displaced circumferentially with respect to others, but this circumstance is ignored, for facility of illustration, in the general cross-section shown in Fig. 1.

The rubber which we utilize in providing the water-passageways under the collector-cylinders 12 is of such high quality that it is not available on the commercial market. This rubber has qualities which allow it to stand an assembly-temperature of 200° C. without losing any of its elasticity or causing it to swell or crack. The rubber end-rings 20 are also chosen for their elasticity and ability to withstand compressive loads of above 500 pounds per square inch, without permanent set or serious deformation.

The choice of rubber of the above-mentioned high qualities and characteristics facilitates the assembly of the collector, in which operation it is practically necessary to heat the collector to a temperature of slightly above 200° C. in order to expand it sufficiently to slip it over the various rubber rings and cross-overs, and to enable it to have the necessary shrink-fit on its innermost end. It is also desirable to expand the collector-cylinder enough to permit the assembly-operation without having the collector seize on any of the rubber and ruin it. As soon as the heated collector-cylinder is in its final position, in the assembly-operation, a quantity of previously cooled water is immediately poured into the water-circulating system, in order to bring down the collector-temperature as quickly as possible, in order not to subject the rubber to any more punishment than is necessary.

As shown in Fig. 1, the inlet and outlet water for the right-hand collector-cylinder 12 is piped to the right-hand end of the shaft 8 through a gland 31, and the inlet and outlet water for the left-hand collector-cylinder 12 is piped to the left-hand end of the shaft 8. The shaft 8 is provided with a central bore 32 which extends all the way through it, but in effect it is divided into two bores, extending from the respective ends of the shaft, by means of plugs or water-separators 33 which seal the inner portion of the bore and separate the two water-circulating systems for the two collector-cylinders 12.

At each end of the shaft the bore is divided into two concentric passages for cooling fluid, by means of a pipe 34 within the bore. This pipe serves as the inlet passageway, which is connected to a water-supply pipe 35 externally of the machine through the gland 31 at its end of the machine. The annular space 36 between the inlet pipe 34 and the bore constitutes the outlet passageway which is connected to a water-discharge pipe 37 externally of the machine by means of the gland 31 at its end of the machine. We preferably utilize glands of a type having no packing, and we have found that this type of gland is eminently satisfactory.

The concentric water passages 34 and 36 through which water is lead into and out of the machine at each end of the shaft are converted, by means of an adaptor 38, into two axial passages divided by a partition 39 extending approximately diametrically across the bore of the shaft, under each collector-cylinder 12, so that the three communicating passages 29 which provide the intake-passages between the central bore 32 and the spiral passageways 24 under the collector-cylinder may all be tapped into one half of the central bore in the shaft, while the three communicating discharge-passageways 30 are tapped into the other half of the bore, as shown in Fig. 1.

The operation of our water-circulating system will be obvious from the foregoing description, and the water-flow paths are indicated on the drawings by means of arrows. The water enters through the gland 31 into the inlet pipe 34 and through the adaptor 38 where it is discharged into the upper half of the bore 32, above the partition 39, in the position of the shaft shown in Fig. 1. The water then divides into a plurality of paths, three paths 29 being shown, through which it enters the spiral passageways 24 under the collector-cylinder 12, in three parallel water circuits, being discharged through the three discharge passages 30, whence the discharge-water combines in a single stream passing out through the annular discharge-space 36 and through the gland 31 to the water-discharge pipe 37 externally of the machine.

Our water-cooling arrangement of the collectors is very liberally proportioned with the idea that the user of the machine should not be limited in his choice of any particular grade of brushes, of either high- or low-voltage contact-drop, which could be used without overheating the collectors. Our water-cooling system is capable of dissipating a loss of 175 kilowatts from each collector, with a 30° C. temperature rise, which would correspond to the use of brushes having a single contact drop of 1 volt, which is fairly high, with a load of 150,000 amperes. The machine is tested with two grades of brushes, one having .3 volt per contact and the other having 1.0 volt per contact, the latter being found to be preferable because of the better current-distribution, or current-division between the brushes, which is obtained therewith.

Our design of extremely efficient water-cooling for the collector cylinders, as described herein, is an important contributing factor to the achievement of the extremely large output of 150,000 amperes at 7 volts, in a machine which is as small as the particular design shown in our drawings. The really great problem of such high-current-capacity unipolar machines is to collect the current, so that the machine must be built around the collector-cylinders. Various factors contribute to the choice of the design of the collector-cylinders. The particular factor which is dealt with, according to the present invention, is the cooling of the collector-cylinders. Without this effective cooling it would probably be necessary to resort to cylinders of much larger physical size, and to resort to higher peripheral velocities which would in turn introduce other serious disadvantages. Our water-cooling system, therefore, constitutes a necessary integral part of the design of the entire machine.

The importance of our water-cooling system for the collector-cylinders is so great that we have deemed it necessary to interlock the operation of the generator with the water-supply for the collector-cylinders, so as to prevent operation of the machine, even at no load, in case of a failure of the water supply. To this end, as indicated diagrammatically in Fig. 6, we place a water-flow relay 40 in the water-supply circuit, so that if the water-flow is interrupted, or reduced below a predetermined minimum, even momentarily, the electrical contacts 41 of the water-flow relay will be opened, thereby interrupting the field 43 of a motor-driven exciter 45. A preferred form of water-flow relay is one operating on the Venturi gauge type, but any other form may be used. The exciter armature circuit 47 normally energizes a holding-coil 49 on a main contactor 51 which connects a welding load 53 to the unipolar generator. The exciter armature circuit 47 normally also energizes a holding-coil 55 on an alternating-current contactor 57 which energizes a synchronous motor 59 which drives the unipolar generator. The exciter armature circuit normally also energizes the field winding circuit 61 of this motor. The exciter armature circuit 47 also normally energizes the shunt field windings 63 of the unipolar generator. Thus, when the water-flow system fails, in the unipolar generator, the entire set is shut down, thus making it impossible for the unipolar generator to supply any load-current, and even protecting the uncooled collectors from the friction of the brushes 13 under these circumstances.

While we have described our invention in a single preferred form of embodiment, which has proven in actual service to be extremely advantageous, it will be obvious that many changes in design and execution may be made by those skilled in the art, without departing from the essential spirit of our invention. We desire, therefore, that the appended claims shall be accorded the broadest construction consistent with their language and the prior art.

We claim as our invention:

1. A liquid-cooled collector-cylinder assembly particularly adapted for unipolar generators of low voltage and high current-capacity, comprising the combination, with the collector-cylinder, of a shaft on which said cylinder is mounted, means for providing spiral passageways between said cylinder and said shaft, means for introducing a cooling liquid into said spiral passageways at a plurality of axially spaced points, and means for removing said liquid from said spiral passageways at a plurality of axially spaced points.

2. A liquid-cooled collector-cylinder assembly particularly adapted for unipolar generators of low voltage and high current-capacity, comprising the combination, with the collector-cylinder, of a shaft on which said cylinder is mounted, said shaft having a central bore therein extending from one end thereof, a pipe within said bore for dividing the same into two concentric passages for cooling fluid, means for introducing and removing cooling fluid into and from said concentric passages at the end of the shaft, an adaptor for converting said concentric passages into two axial passages divided by a partition extending approximately diametrically across the bore of the shaft, under the collector-cylinder, means for providing collector-cooling passageways between said cylinder and shaft, means for providing a plurality of axially spaced communicating-passages between said collector-cooling passageways and the axial passage on one side of said partition, and means for providing a plurality of other axially spaced communicating passages between said collector-cooling passageways and the axial passage on the other side of said partition.

3. In a machine having a rotating part, means for providing cooling passageways in said part at points radially removed from the axis thereof, said part having a central bore therein extending from one end thereof, a pipe within said bore for dividing the same into two concentric passages for cooling fluid, means for introducing and removing cooling fluid into and from said concentric passages at the end of the rotating part, an adaptor for converting said concentric passages into two axial passages divided by a partition extending approximately diametrically across the bore of the rotating part, means for providing a plurality of axially spaced communicating-passages between said cooling passageways and the axial passage on one side of said partition, and means for providing a plurality of other axially spaced communicating passages between said cooling passageways and the axial passage on the other side of said partition.

4. The combination, with a collector-cylinder of a dynamo-electric machine, of a shaft on which said cylinder is mounted, and means for providing spiral passageways between said cylinder and said shaft, said means comprising a plurality of circumferential grooves in the shaft under the collector-cylinder, ring-members in said grooves, and cross-over members between adjacent ring-members for providing said spiral passageways.

5. A liquid-cooled collector-cylinder assembly particularly adapted for unipolar generators of low voltage and high current-capacity, comprising the combination, with the collector-cylinder, of a shaft on which said cylinder is mounted, said shaft having a central bore therein, insulating passageway-forming and separator means disposed between said cylinder and said shaft for separating the one from the other and at the same time providing a passageway for cooling-liquid therebetween, and means communicating with said central bore for introducing and removing cooling-liquid to and from said passageway.

6. A water-cooled collector-cylinder assembly particularly adapted for unipolar generators of low voltage and high current-capacity, comprising the combination, with the collector-cylinder, of a shaft on which said cylinder is mounted, said shaft having a central bore therein, insulating passageway-forming and separator means disposed between said cylinder and said shaft for separating the one from the other and at the same time providing a passageway for cooling-water therebetween, means communicating with said central bore for introducing and removing cooling-water to and from said passageway, and means for maintaining a water-velocity higher than about eight feet per second in said passageway.

7. A water-cooled collector-cylinder assembly particularly adapted for unipolar generators of low voltage and high current-capacity, comprising the combination, with the collector-cylinder, of a shaft on which said cylinder is mounted, said shaft having a central bore therein, passageway-forming means disposed between said cylinder and said shaft for providing a passageway for cooling-water therebetween, means communicating with said central bore for introducing and removing cooling-water to and from said passageway, and means for maintaining a water-velocity higher than about eight feet per second in said passageway.

8. The combination, with a long, single-piece cylindrical current-collecting member of a dynamo-electric machine, of a shaft on which said current-collecting member is mounted, means for firmly anchoring one end of the current-collecting member to the shaft, and means for so supporting the other end of the current-collecting member from the shaft that it is centered thereon while being substantially free to expand and contract axially, due to temperature-variations, without substantial impediment to such axial movement.

9. A liquid-cooled collector-cylinder assembly particularly adapted for unipolar generators of low voltage and high current-capacity, comprising the combination, with the collector-cylinder, of a shaft on which said cylinder is mounted, said shaft having a central bore therein, an insulating band disposed between said cylinder and said shaft at each end of the cylinder, means for firmly anchoring one end of the cylinder on its insulating band on the shaft, means for so supporting the other end of the cylinder on its insulating band as to have substantial freedom of axial movement due to thermal expansions and contractions of the cylinder, the peripheral surface of said shaft being spaced from the inner bore of the cylinder between said insulating bands, defining an annular space for liquid-cooling, a yieldable insulating ring making a liquid-tight joint at each end of said annular space, and means communicating with said central bore for circulating a cooling-liquid in said annular space.

10. The invention as defined in claim 1, characterized by the fact that the means for providing spiral passageways is of insulating material.

11. The invention as defined in claim 4, characterized by the fact that the ring-members and the cross-over members are of insulating material.

12. The invention as defined in claim 8, characterized by the fact that the means for anchoring one end and the means for supporting the other end of the current-collecting member both include insulating material for insulating the current-collecting member from the shaft.

13. The invention as defined in claim 1, characterized by means, responsive to a substantial failure of said cooling-liquid flow for even a brief time, for making it impossible for the associated machine to be loaded to any considerable extent.

14. The invention as defined in claim 4, characterized by means, responsive to a substantial failure of said cooling-liquid flow for even a brief time, for making it impossible for the associated machine to be loaded to any considerable extent.

15. The invention as defined in claim 7, characterized by means, responsive to a substantial failure of said cooling-liquid flow for even a brief time, for making it impossible for the associated machine to be loaded to any considerable extent.

FLOYD T. HAGUE.
FREDERICK R. J. DAVIS.